(12) United States Patent
Yang

(10) Patent No.: US 7,142,748 B1
(45) Date of Patent: Nov. 28, 2006

(54) OPTICAL WAVEGUIDE EVANESCENT RIBBON COUPLER

(75) Inventor: Jianwen Yang, Miami, FL (US)

(73) Assignee: New Span Opto-Technology, Inc., Miami, FL (US)

( * ) Notice: Subject to any disclaimer, the term of this patent is extended or adjusted under 35 U.S.C. 154(b) by 69 days.

(21) Appl. No.: 10/798,209

(22) Filed: Mar. 11, 2004

(51) Int. Cl.
 G02B 6/26 (2006.01)
 G02B 6/42 (2006.01)
 G02B 6/12 (2006.01)
 G02B 6/36 (2006.01)

(52) U.S. Cl. .......................... 385/30; 385/14; 385/29; 385/31; 385/88; 385/89; 385/92; 385/93

(58) Field of Classification Search ............ 385/29–32, 385/42, 14, 88, 89, 92, 93, 114
See application file for complete search history.

(56) References Cited

U.S. PATENT DOCUMENTS 4,493,528 A * 1/1985 Shaw et al. ................... 385/30
4,533,208 A * 8/1985 Stowe ........................... 385/46
2003/0123804 A1* 7/2003 Nikonov et al. .............. 385/49

* cited by examiner

Primary Examiner—Brian Healy
Assistant Examiner—Jerry Martin Blevins

(57) ABSTRACT

An evanescent optically coupled electronic device including: a backplane wave guide or mother board including a set of parallel carriers that define a first plurality of parallel channels and include a first array of optical fibers having exposed cores in the first plurality of parallel channels; at least one electronic card or daughter board including a high speed optical waveguide bus; a flexible fiber ribbon or film including waveguides made up of individual optical fibers of locally increased refractive index joined by a web of suitable material forming the high speed optical waveguide bus and optically connecting the backplane waveguide and the at least one electronic card with no 90° angle turns; and a mechanism for retaining the first array of optical fibers having exposed cores in abutting and facing evanescent optical contact with the individual optical fibers in the flexible fiber or ribbon.

8 Claims, 5 Drawing Sheets

PRIOR ART Fig. 1

OPTICAL WAVEGUIDE EVANESCENT RIBBON COUPLER

This invention was made with Government support under contract DASG60-02-P-0206 awarded by U.S. Army Space and Missile Defense Command. The Government has certain rights in the invention.

FIELD OF THE INVENTION

The present invention relates to optical interconnects for computing and processing systems and more particularly to an array waveguide evanescent coupler (AWEC) for daed-to-backplane optical connection.

BACKGROUND OF THE INVENTION

Ongoing research and development efforts in very large scale integrated (VLSI) circuits have led to a dramatic decrease in component size and an increase in overall chip size. The increase in complexity and density of the IC's is expected to increase the speed and reliability of the systems in which they are used and, at the same time, reduce the amount of power consumed. One major limitation of packaged chips which use electrical interconnects is the relatively long distances required to interconnect devices and circuits on a common substrate or to connect chip packages on different circuit boards. Often, the interconnections use aluminum or polysilicon lines. Ohmic power losses, long delay times escessive wafer space, and complex patterning techniques, are some of the other limitations associated with electrical interconnects. Operating speed, for example, can be limited by external electromagnetic interference (EMI) from connecting lines, which can keep speeds to less than a few hundred MHz for compact systems. This greatly limits its ability for fast computing and image data processing for both military and commercial applications.

Personal computers are currently making dramatic advancements. The CPU speed has increased significantly in a short time period. Flexible USB memory key is gradually replacing floppy drives. Compact disk (CD) is advancing to CD-R, CD-RW, DVD, and DVD-RW. However, there is no significant improvement on the computer motherboard because the existing interconnect still relies on electrical means that limit its improvement potential as mentioned above.

In comparison to electrical interconnects, optical interconnects offer several advantages, including the ability to achieve high data rate signal transmission, large fanout densities, and the ability to reduce capacitive and inductive loading effects. Because of their high speed and wide bandwidth capabilities, with interconnect parameters independent of interconnection distance, optical interconnects are excellent candidates to replace electrical interconnects in a variety of applications, including those which require high data rate operation (>1 Gb/s), long distance signal propagation (intra-board chip-to-chip, board-to-board (or card-to-card), and system-to-system), low power consumption, and immunity to radiation and EMI. A comparison between optical and electrical interconnects, based on power and speed considerations, has shown that, at data speeds >3 GHz, the switching energy for electrical interconnects increases abruptly, making them unsuitable for practical systems. Crosstalk and EMI effects further degrade their performance, thereby making optical interconnects very attractive for chip-to-chip and card-to-card applications.

For card-to-card (sometimes also called board-to-board) optical interconnects, free space interconnect architecture has been extensively investigated. The use of vertical cavity surface emitting laser arrays (VCSELs) and photodetector arrays has been considered a promising approach. Although holographic based interconnection schemes and substrate backplane interconnect schemes have been examined, the preferred schemes use microlens arrays to collimate and deliver the array interconnect beams from a VCSEL array to photodetector arrays located on different circuit cards. This type of card-to-card optical interconnect has its limitations, namely it is unsuitable for interconnecting cards with optical blocking by other cards placed in between. It further suffers from alignment sensitivity since each card, after plug-in to the backplane, could be tilted in its orientation. The adjustment to achieve optical alignment is complicated by the array VCSELs and photodetector arrangement (four-axis alignment). The aligned system suffers further from vibration sensitivity. All these are the major drawbacks of current card-to-card free-space optical interconnect architectures.

The guided-wave approach for card-to-card optical interconnection offers excellent interconnect path stability and is suitable for multi-card interconnects. It is seen as the only feasible means to accommodate the large bisection bandwidth of future military and civilian processing systems. Fiber array is promising for longer distance interconnection while local channel waveguide array is suitable for shorter distance multi-card optical interconnections. The major obstacle for card-to-backplane optical interconnects using a backplane waveguide is the requirement for a 90° out of plane turn by the optical waveguide (using a 45° etched waveguide endface (mirror). This turn greatly increases the cost of manufacture and degrades backplane reliability. The out of plane waveguide coupling is not energy efficient in general and thus the systems suffer significant power loss. When some cards are not plugged in (as in the case of a computer), these 90° out of plane turns still consume optical power. This situation is different from that in an electronic backplane that does not consume electrical power when the cards are not plugged in. It is, therefore, desirable to develop an optical coupling technology with the following requirements:

Able to tap optical signal power from the backplane waveguide (or fiber) to card waveguide (or fiber) or vise versa when the card is plugged into the backplane.

The coupler is not a 90° out of plane coupler with an angle etched mirror.

When the card is not plugged in, there is no coupling power loss on the backplane waveguide. In other words, there are no terminating ends on the backplane waveguides near the card plug-in locations.

The coupler must be fabricated at low cost and the coupling performance must be reliable.

The coupler is easy to handle by any person without special training. Furthermore, it is preferred that the coupler can be operated by one hand since this would be useful for space based applications.

OBJECTS OF THE INVENTION

It is therefore an object of the present invention to provide an optical coupler that is not a 90° out of plane coupler.

It is another object of the present invention to provide an optical coupler system that does not result in coupling power loss on the backplane waveguide when a card is not plugged in.

It is yet another object of the present invention to provide a cost effective optical coupler whose production costs are relatively low and whose reliability is high.

SUMMARY OF THE INVENTION

According to the present invention, there is described a novel array waveguide evanescent coupler (AWEC) for card-to-backplane or other appropriate optical interconnections. Evanescent coupling is similar to the well-known waveguide directional coupling. The coupler comprises: (A) a coupler frame; and B) a pair of opposing, parallel carriers that are housed within the frame and define facing parallel and coaxial channels that receive: 1) backplane waveguide optical fibers or another first array of optical fibers having a exposed cores; and 2) a second array of optical fibers or AWEC ribbon fibers having a exposed cores and retain them in facing evanescent optical contact. A securing mechanism in the form of locking screw(s) or spring(s) in or inserted into the coupler frame provide for the retention of the optical fiber cores of a pair of fiber ribbons or backplane waveguide fiber ribbon cores and AWEC ribbon fiber cores in evanescent optical contact. Optionally, a layer of index matching fluid between facing optical fibers or fiber ribbons may be used. The method for achieving evanescent coupling is also described.

DETAILED DESCRIPTION

Figure 1:
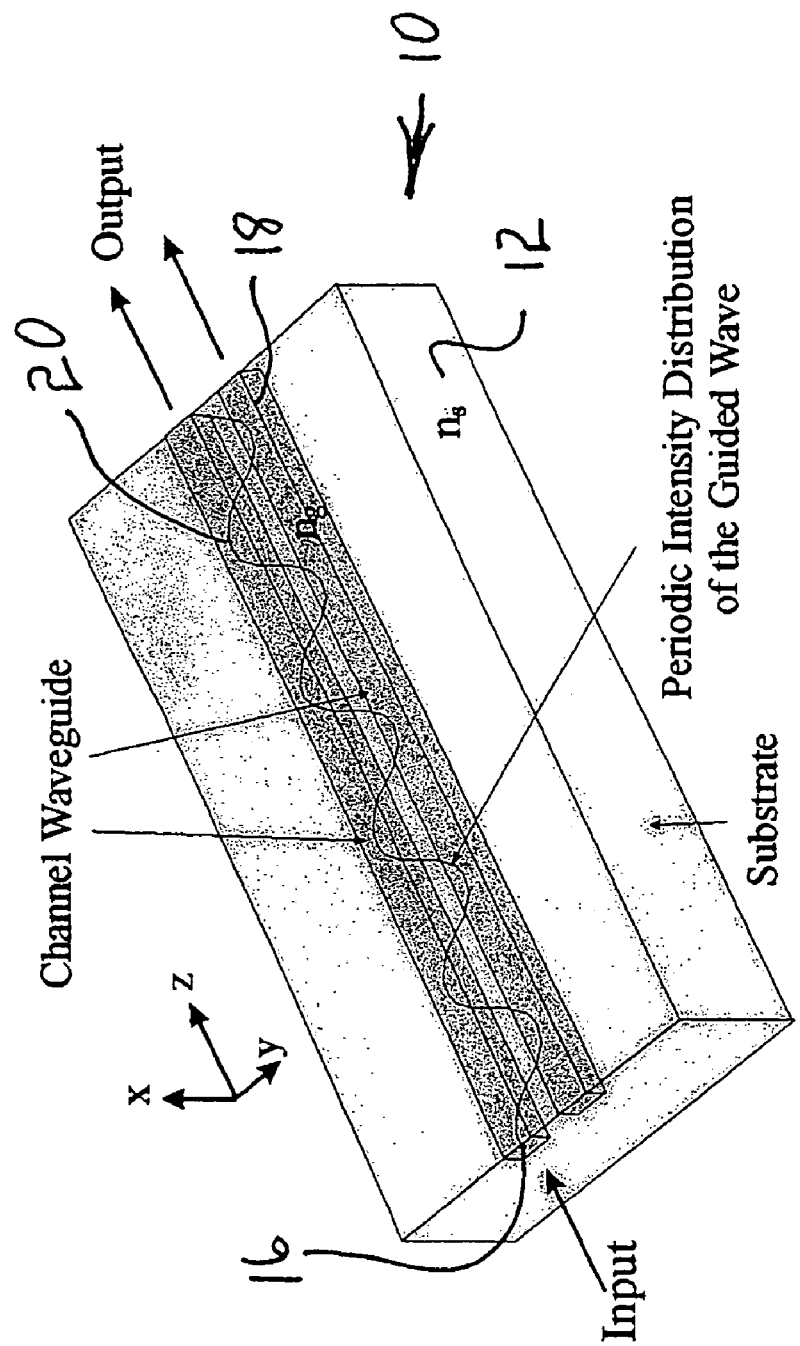
FIG. 1 is a schematic representation of a conventional prior art two-channel waveguide showing directional coupling between them.

FIG. 1 shows a conventional prior art waveguide directional coupler structure 10. In this conventional configuration, a substrate 12 has mounted therein an input channel 16 and an adjacent output channel 18. The directional coupling results in the spatial periodic modulation of light intensity as shown by sinusoidal curve 20. Assume that the input light is in channel waveguide 16 at the point z=0 (see FIG. 1), the light intensities of the propagating mode in the two channel waveguides can be evaluated by the coupled mode theory and are given as follows $$I_1(z) = I_0 \cos^2(\kappa z),$$

$$I_2(z) = I_0 \sin^2(\kappa z), \quad (1)$$

where $I_0 = E_0^2$. $\kappa$ is the coupling coefficient between the modes in the two waveguides 16 and 18 which depends strongly on the shape of the mode tails in the channel waveguides and the channel separation. $\kappa$ can be determined by $$\kappa = \frac{2h^2 p e^{-ps}}{\beta\left(w + \frac{2}{p}\right)(p^2 + h^2)}, \quad (2)$$

where $$p^2 = \beta^2 - n_s^2 k_0^2,$$
$$h^2 = n_g^2 k_0^2 - \beta^2, \quad (3)$$
$$\tan(hw) = \frac{2ph}{h^2 - p^2}.$$

Here, $k_0 = \omega/c$. w is the channel width, s is the channel separation, $\beta$ is the waveguide mode propagation constant in the z direction, h and p are respectively the propagation constant and the extinction coefficient in the y direction. $n_g$ and $n_s$ are the refractive indices of channel waveguides and the substrate, respectively.

From Equation (1), it can be seen that the fundamental guided beam intensity does indeed transfer back and forth between the two parallel waveguides as a function of propagation length. The period $\Lambda$ of the light intensity within one of the waveguides is given by $\Lambda = \pi/\kappa$. $\lambda$ is the light wavelength.

As used herein the following terms are meant to have the indicated meanings and to refer to the defined structures: "fiber ribbon(s)" is meant to describe and refer to any array of optical fibers, glass or plastic or polymeric, in the form of a ribbon or film including polymer waveguides comprising individual optical fibers or linear regions of locally increased refractive index joined by a web of a suitable material. Thus, while in the description, the terms AWEC waveguide and fiber ribbon are used to describe different, but similar structures they may both be considered "ribbons" for purposes of their use in this application. Additionally, although portions of the description herein refers to "D-shaped optical fibers" it will be readily understood by the skilled artisan that such language is being used only because the most common form of optical fiber currently supplied is in the form of a round structure that most approximates the final shape that can be juxtaposed in evanescently coupled relationship with another similar optical fiber having an exposed core as described below. Thus, it will be readily understood by the skilled artisan that square, rectangular or even ovate fibers can be similarly used in the device of the present invention. Also, as alluded to above, it is clearly intended to include polymer waveguides as well known to the skilled artisan within the term "fiber ribbon(s)", since such structures inherently and effectively include optically conductive fiber cores of the type necessary for the successful practice of the present invention.

Figure 2:
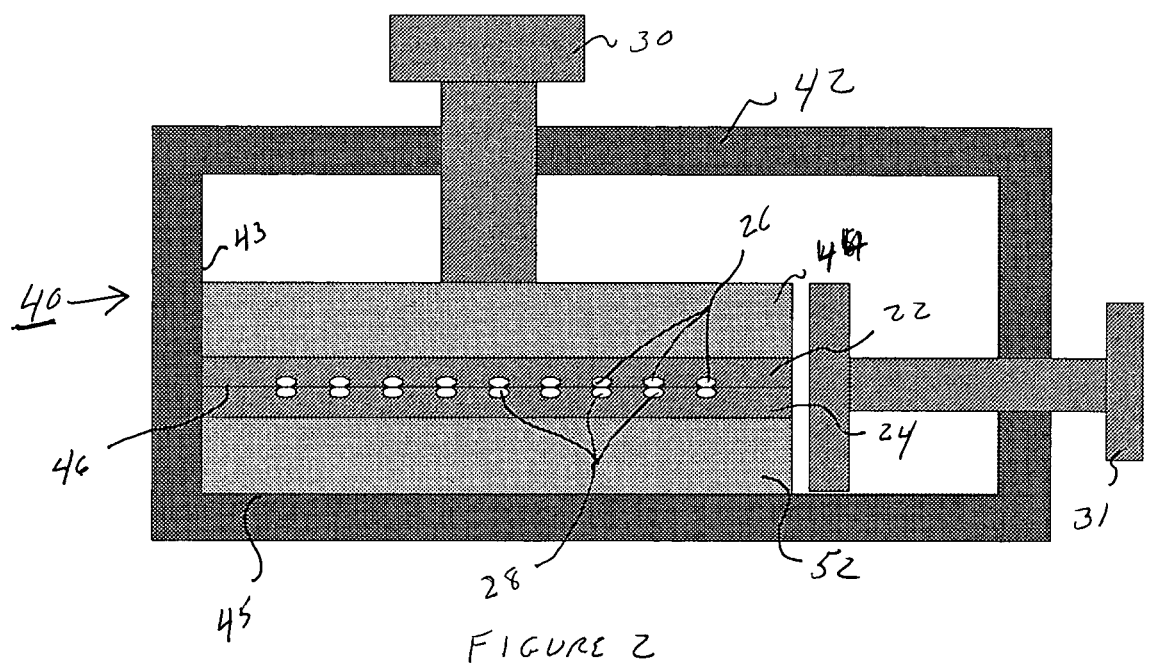
FIG. 2 is a schematic, cross-sectional end view of one embodiment of an AWEC device in accordance with the present invention.
Figure 4:
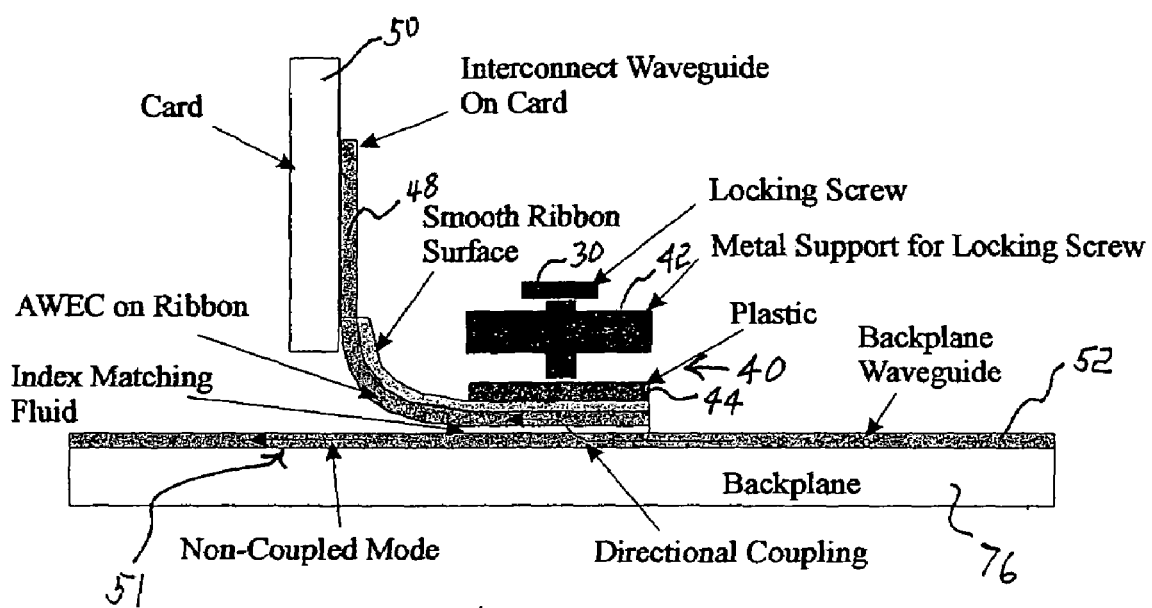
FIG. 4 is a schematic enlarged side view of the AWEC coupling of the present invention for card-to-backplane optical interconnection.

As described below and shown in FIGS. 2 and 4 in our geometry, the two channel waveguides or fiber ribbons are located on two separate carriers 22 and 24. One is on the AWEC ribbon 48 (see FIG. 4) formed by the combination of ribbon fiber cores 26 in ribbon carrier or substrate 22 while the other is on the backplane waveguide 52 formed by the combination of ribbon fiber cores 28 and ribbon substrate or carrier 24. Nevertheless, the coupling concept is the same as for the prior art device just described. The input waveguide is the backplane waveguide 52 as shown in FIGS. 2 and 4 and described in detail below. Z is the effective coupling length, i.e., the useful coupling region length of the AWEC ribbon 48 or the length over which fibers 26 and 28 abut in coupler 40. The coupling constant κ must be controlled so that $I_2$ from Equation (1) achieves a reasonable value. The control of coupling constant is done by adjusting the pressure through the locking screws 30 and 31 shown in FIG. 2 or the spring shown in FIG. 5. As described below, a layer of index matching fluid 46 may be added to improve coupling performance but is not necessary.

Referring now to FIGS. 2 and 4 that show, in FIG. 2 a schematic end view of the coupler of the present invention and in FIG. 4 a schematic side view of the optical coupler of the present invention, coupler 40 comprises an opposing pair of substrates or carriers 22 and 24 that, when abutted as shown in FIG. 2, bring ribbon fiber cores 26 and 28 into intimate and evanescent optical contact. According to a preferred embodiment of the present invention these two ribbon fiber cores are the optical fiber cores of a backplane waveguide and those of a general fiber ribbon for coupling with the backplane waveguide. A frame 42 is provided for mounting locking screws 30 and 31 that apply pressure to a pressure plate 44 to assure uniform application of pressure across carrier 22 and consequently ribbon fiber cores 26 and 28 bringing them into intimate and evanescent contact. An optional thin layer of index matching fluid 46 is shown in FIG. 2 and described more fully below. As will be apparent to the skilled artisan, locking screws 30 and 31 are preferably threaded into and through frame 42, but any other suitable structure that allows locking screws 30 and 31 to apply suitable pressure to coupler 40 as shown in FIG. 2 would be appropriate.

As shown most clearly in FIG. 4, AWEC ribbon 48 incorporating optical fiber ribbon cores 26 forms the transition and connection with card 50. In those areas of backplane 52 where optical ribbon fiber cores 28 do not contact or lie in evanescent optical contact with optical ribbon fiber cores 26, i.e. outside the boundaries of optical coupler 40, in area 51, light travelling through ribbon fiber cores 28 is in a non-coupled mode while in those areas where evanescent contact between ribbon fiber cores 26 and 28 occurs, i.e. within the boundaries of optical coupler 40, light is in a coupled mode. Thus, no optical energy is lost in the system when no coupler 40 is present as with more conventional electronic systems.

A key feature of the evanescent coupler 40 according to a preferred embodiment of the device of the present invention is the lateral alignment between the optical ribbon fiber cores 26 and the optical ribbon fiber cores 28. In experimental uses visual alignment under a microscope can be used. However, in commercial applications, the coupling alignment can be done by pressing both ribbon fiber structures to the coupler 40 side wall 43 and bottom wall 45 (see FIG. 2) and thus the alignment between the optical ribbon fiber cores 26 and the optical ribbon fiber cores 28 is rendered automatic. Of course, coupler 40 could be forced into any corner of frame 42.

Figure 6:
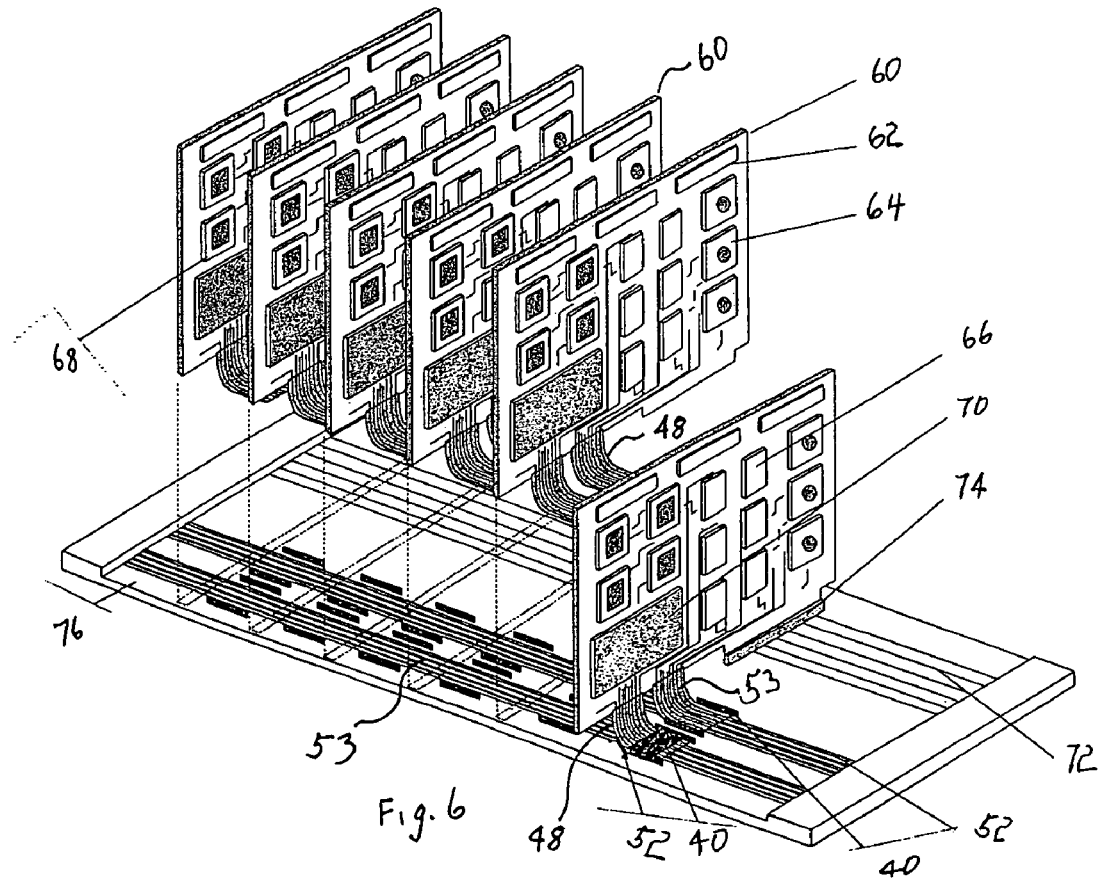
FIG. 6 is a schematic representation showing the card-to-backplane optical interconnect using the array waveguide evanescent coupler of the present invention.

FIG. 6 is a schematic depiction of the novel evanescent coupler 40 in its use for multi-card backplane optical interconnects. Both the backplane waveguide 52 and the AWEC ribbon 48 are as described herein. Electronic cards 60 having memory chips 62, interface chips 64, dedicated processor chips 68 and other chips 66 as well as a reduced instruction set computer 70 and a slow speed electrical data bus 72 that connects to a slow speed electronic control line connector 74, for example, are located on a backplane 76 that also incorporates high speed optical waveguide bus 53 formed by using the waveguide ribbon fibers. It should be noted that there are no 90° angle turns on backplane waveguide 52 and thus no terminal loss when a card 60 is not plugged in.

Figure 5:
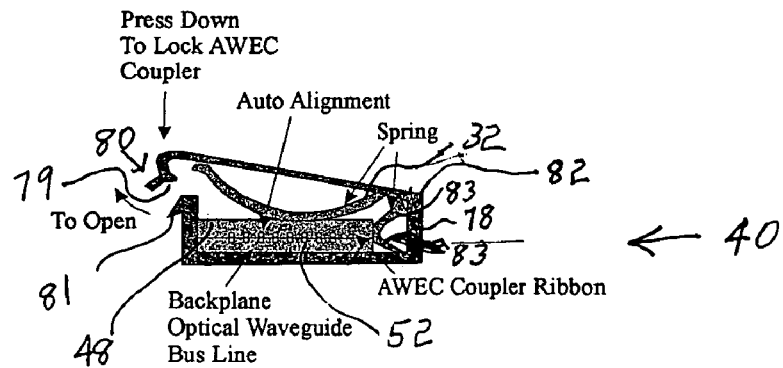
FIG. 5 shows an alternative embodiment of the optical coupler of the present invention.

FIG. 5 shows an alternative embodiment of the optical coupler 40 of the present invention. According to this embodiment, coupler 40 utilizes a calibrated spring 32 to achieve the required coupling pressure described above. Calibrated spring 32 is located in this embodiment within a frame 78 that incorporates a latching mechanism 80, a hinge point 82 and a retainer spring 83 that keeps coupler ribbon 48 and backplane waveguide ribbon 52 in proper abutting orientation and location within housing 78. When latching arrangement 80 is "closed", i.e. both portions 79 and 81 of latching mechanism 80 are engaged in the conventional fashion coupling pressure is applied as described above in connection with the use of locking screw 30. The retainer spring 83 presses both coupler ribbons toward the common side wall of the housing 78 to achieve auto alignment of the ribbon fiber cores 26 and 28.

The success of the directional coupling between backplane waveguide ribbon fibers 28 and AWEC ribbon fibers 26 prefers that optical ribbon fiber cores 26 and 28 and in particular the optically coupling portions of such ribbon fiber cores be fabricated from the same material and by the same process to ensure identical guiding effective index. Index matching fluid 46 preferably having a refractive index slightly smaller than that of optical ribbon fiber cores 26 and 28 can be added in the coupling contact region. Such index matching fluid can greatly enhance the backplane waveguide 52 to AWEC ribbon 48 coupling efficiency in a preferred embodiment. The choice of a slightly smaller refractive index for the index matching fluid is to preserve the waveguide mode propagation without causing local waveguide termination. As described below, an index matching fluid having an index of refraction the same as or slightly higher than that of the optical ribbon cores can also be used, but with some loss of coupling energy. Locking screw 30 or spring 32 can control the physical gap between backplane waveguide fiber cores 28 and the AWEC optical ribbon fiber cores 26 and thus control the coupling efficiency. We note here that the coupling efficiency depends on both the coupling region length and the optical ribbon fiber core separation. The control of the locking screw 30 or spring 32 pressure can be very effective in coupling efficiency control. Obviously, evanescent coupler 40 will serve as an effective means for tapping out optical signal from backplane waveguide data bus line 52 and can also insert an optical signal from the plug-in card to the backplane waveguide data bus lines 52. The connection between AWEC ribbon 48 and interconnect waveguide 53 on card(s) 60 can be done by butt coupling using suitable packaging epoxy. Direct connection of ribbon fibers to the destination on the card is also possible. In this way the butt coupling is avoided.

As stated hereinabove, the optical ribbon fiber cores 26 and 28 form an important aspect of the present invention. The ribbon fibers can be assembled using D-shape fibers (see FIG. 7). D-Shape fiber by its name has a D-shape cross-section. Such fiber can be purchased from KVH Industries, 50 Enterprise Center, Middleton, R.I. 02842. Such D-shape fiber's core may not be, and generally is not, exposed at its flat side. Suitable etching in a diluted hydrofluoric acid solution, for example, can be used to expose the fiber cores for the desired evanescent coupling applications described herein.

The large distance from the fiber core to the flat surface, prevents the evanescent coupling between D-shape fibers pressed together on the flat side as shown in the attached Figures. To facilitate the required evanescent coupling, the fiber cladding 75 (see FIG. 7) must be partially removed to fully expose the fiber core 77.

Figure 7:
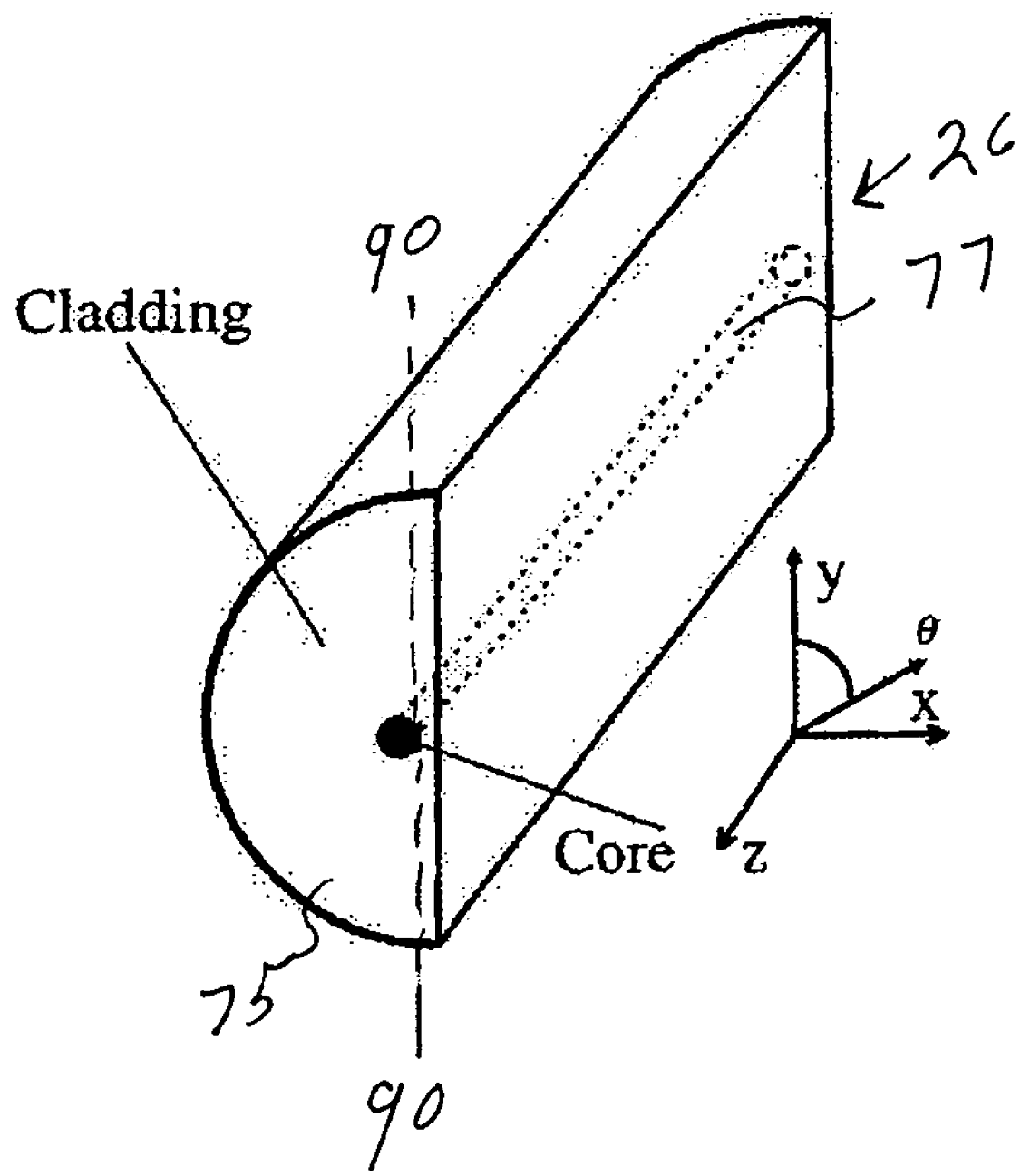
FIG. 7 is a perspective, cross-sectional view of a D-shaped optical fiber of the type useful in the coupler of the present invention.

In order to obtain D-shaped fibers of a configuration to achieve the results described herein, fiber structure 26 in FIG. 7 must be reduced or "flattened" to a point along the line 90—90 shown in FIG. 7. Such reduction or flattening is achieved using a diluted hydrofluoric acid with 5% concentration, and carefully etching D-shape fiber structure 26, including cladding 75 to obtain the required D-shaped optical fiber.

Figure 3:
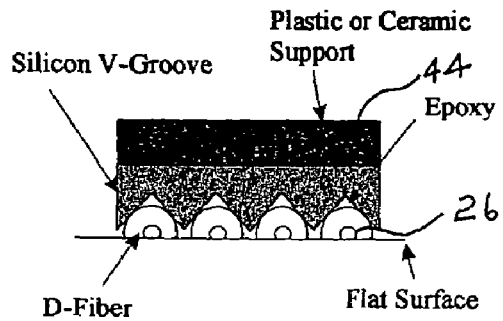
FIG. 3 is a schematic end view showing one method of fabricating the evanescent coupler of the present invention.

After the D-shaped fiber etching to expose the fiber core 77, it is ready for assembly to form the D-shaped fiber based AWEC ribbon 48. The packaging of D-fiber based AWEC ribbon 48 can be done by laying the flat portion of the D-shaped fibers facing down on a smooth glass surface and applying a silicon V-groove to put D-shaped fibers into array format as shown in FIG. 3. Epoxy can be used to fix the D-shaped fibers in position. A piece of hard plastic or ceramic 44 is preferably attached to the back of silicon carrier 22 for stronger support. This can be done on both ends of D-shape fiber ribbon 48. The D-shape fiber array can also be laid on backplane 52 in a similar manner with its flat face facing upward. At the designated coupling region, the optical ribbon fiber cores 26 and 28 can also be supported by silicon. In this way the fiber-to-fiber separations on the AWEC ribbon 48 and on the backplane waveguide 52 are identical being controlled by carriers 22 and 24 (shown in FIG. 2).

Using a D-shaped fiber array prepared as just described, in evanescent coupler 40, evanescent coupling between two such fiber arrays is achieved. A coupling length is on the order of just a few millimeters can yield significant coupling efficiency.

Another method for producing a suitable optical fiber array is by physically polishing or abrading a commercially available fiber ribbon array. Such commercially available fiber ribbon arrays come complete with ferrule ends. By polishing or abrading the fibers contained in such an assembly, a substantially fiber array of the type described herein can be obtained and a pair of such "polished fiber ferruled arrays" placed in facing relationship to obtain coupler 40 of the present invention.

The invention mentioned above uses the terms of "evanescent coupling" and "evanescent coupler" to describe the working principle of optical coupling from the pair of coupling fibers or waveguides. The illustrated coupling concept can be further extended to cover any optical coupling phenomenon involving the uses of additional gratings in the coupling region and or other non-evanescent coupling that can transmit optical power from one exposed core to the other.

While the invention has been described in the context of a frame that retains a plurality of optical fibers in evanescent contact, it will be readily understood by the skilled artisan that the term "frame" can be interpreted to include any of a vast number of structures capable of retaining a plurality or even a single pair of optical fibers in evanescent or optically coupled contact. Thus, any mechanism that serves to retain at least two optical fibers in contact such that wave energy in the electromagnetic spectrum such as visible, UV and or IR emissions can be transmitted from one fiber to another is contemplated as within the meaning of the term "frame" and such a structure is referred to in the appended claims as a "mechanism" for retaining one or more fibers in contact such that radiation may be transmitted from one to another.

Also, while the index matching fluid introduced between abutting optical fibers is preferably of a slightly lower index of refraction than that of the optical fibers for purposes of efficiency, it will be readily understood by the skilled artisan that the use of index matching fluids of the same or greater index of refraction than that of the abutting fibers may be used with some loss of coupling energy and efficiency. Such a loss of coupling energy and efficiency may be tolerable in certain other than ideal circumstances and thus, use of such a lower efficiency is contemplated as within the scope of the appended claims.

Finally, although the above description has been provided in the context of the coupling of "a plurality or opposed pairs" of optical fibers, (the most common and desirable context and use) it will be readily apparent to those skilled in the art that the apparatus and methods described herein can be equally effectively used to optically couple a single pair of optical fibers.

As the invention has been described, it will be apparent to those skilled in the art that the same may be varied in many ways without departing from the spirit and scope of the invention. Any and all such modifications are intended to be included within the scope of the appended claims.

What is claimed is:

1. An evanescent optically coupled electronic device comprising:
   A) a backplane wave guide or mother board comprising a set of parallel carriers that define a first plurality of parallel channels and include a first array of optical fibers having exposed cores in said first plurality of parallel channels;
   B) at least one electronic card or daughter board including a high speed optical waveguide bus;
   C) a flexible fiber ribbon or film including waveguides comprising individual optical fibers of locally increased refractive index joined by a web of suitable material forming said high speed optical waveguide bus and optically connecting said backplane waveguide and said at least one electronic card with no 90° angle turns; and
   D) a mechanism for retaining said first array of optical fibers having exposed cores in abutting and facing evanescent optical contact with said individual optical fibers in said flexible fiber or ribbon.

2. The evanescent optically coupled electronic device of claim 1 wherein said a mechanism for retaining said first array of optical fibers having exposed cores in abutting and facing evanescent optical contact with said individual optical fibers in said flexible fiber or ribbon comprises a frame about said set of parallel carriers and said individual optical fibers in said flexible fiber or ribbon and in said frame a mechanism for applying pressure to said first array of optical fibers and said individual optical fibers to assure intimate evanescent contact therebetween.

3. The evanescent optically coupled electronic device of claim 2 wherein the mechanism for applying pressure comprises a member selected from the group consisting of: A) one or more locking screws mounted in the frame; and B) at least one calibrated spring inserted into the frame.

4. The evanescent optically coupled electronic device of claim 3 wherein said frame comprises an enclosed structure having a top a bottom and opposed sides connecting the top and the bottom, said first array of optical fibers having exposed cores in abutting and facing evanescent optical contact with said individual optical fibers in said flexible fiber or ribbon are located in one corner of said enclosed structure against one of said walls and either said top or said bottom and said mechanism for applying pressure comprises a pair of locking screws, one of which penetrates said top or said bottom and the other of said locking screws penetrates one of said walls thereby applying pressure to said opposing parallel carriers from two orthogonal directions.

5. The evanescent optically coupled electronic device of claim 4 further including a pressure distribution plate between said first array of optical fibers and said mechanism for applying pressure to provide even distribution of pressure to the pair of opposing and parallel carriers.

6. The evanescent optically coupled electronic device of claim 5 further including a layer of index matching fluid between said individual optical fibers in said flexible fiber or ribbon and first array of optical fibers having exposed cores.

7. The evanescent optically coupled electronic device of claim 1 wherein said individual optical fibers and said first array of optical fibers comprise D-shaped optical fibers.

8. The evanescent optically coupled electronic device of claim 1 wherein said individual optical fibers and said first array of optical fibers comprise polymeric or glass optical fibers.

* * * * *